April 29, 1941.  W. P. COLE  2,240,242

DRILL PRESS WORK CLAMP

Filed Sept. 30, 1940

W. P. Cole
INVENTOR.

BY CHKnowles
ATTORNEYS.

Patented Apr. 29, 1941

2,240,242

UNITED STATES PATENT OFFICE 2,240,242

DRILL PRESS WORK CLAMP

William P. Cole, Tullahoma, Tenn.

Application September 30, 1940, Serial No. 359,132

3 Claims. (Cl. 77—63)

This invention aims to provide novel means for holding work under a variety of conditions, especially during the drilling of holes, in the operation of a drill press.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
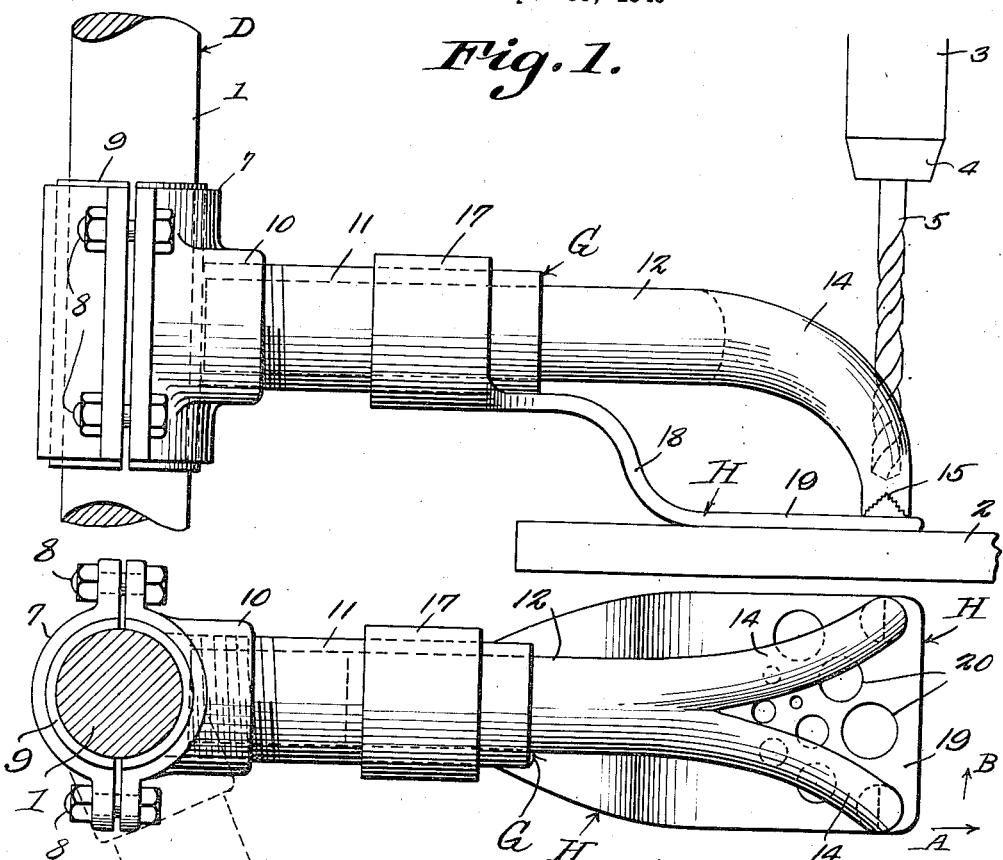
Fig. 1 shows, in side elevation, a device constructed in accordance with the invention.

The device forming the subject matter of this application may be used in many ways, in the field of mechanics, but in order to avoid a waste of words, it will be presumed, for the purposes of illustration and description, that the article is an accessory to a drill press.

In the drawing, therefore, the letter D designates a drill press, including a post 1, a work supporting table 2, and a rotatable shaft 3 carrying a chuck 4, retaining a drill 5 disposed above the work table 2.

In carrying out the invention, there is provided a work grip, which is marked generally by the letter G. The work grip G comprises a two-part, tubular carrier 7, which functions as a clamp, since it can be retained in vertically adjusted positions on the post 1, the carrier functioning, also, as a slide, since it can be adjusted vertically on the post 1. The constituent members of the carrier 7 are held together by side connections, such as draw bolts 8. In order to adapt the carrier 7 to posts 1 of different diameters, bushings 9 are disposed within the constituent members of the carrier. One of the members of the carrier 7 is supplied with a lateral nipple 10, into which is threaded, or wherein is secured otherwise, a tubular guide 11, located approximately at right angles to the post 1 and approximately parallel to the table 2.

The work grip G can be adjusted vertically along the post 1, to secure a proper cooperation between the work grip and the material to be held. As to the way in which the work grip G is retained in vertically adjusted positions, this may be done by tightening up the draw bolts 8. Some operators prefer to leave the draw bolts 8 a little slack, so that the carrier 8 and its bushings 9 do not grip the post 1 closely. Under such conditions, a downward tap with a hammer, on the nipple 10 of the guide 11, will cause diagonally opposite portions of the bushings 9 to grip the post 1 frictionally, a release being effected by tapping upwardly on the nipple 10 of the guide 11: all of which adjustment is a well understood proceeding.

An arm 12 is mounted for longitudinal adjustment, at the will of an operator, in the guide 11. The arm 12 terminates in diverging fingers 14, which are downwardly extended, as shown in Fig. 1. The fingers 14 are provided at their lower ends with transverse notches or recesses 15, the facing surfaces of which may be toothed or roughened otherwise.

A holder H is supplied and includes a collar 17, mounted for sliding adjustment, at the will of an operator, on the guide 11. The collar 17 is supplied with a downwardly extended and forwardly prolonged bracket 18, merging into a broadened foot plate 19 arranged approximately parallel to the arm 12 and adapted to be disposed underneath the fingers 14.

Assuming that the holder H is retracted into an out of the way position, the carrier 7 can be adjusted vertically on the post 1, and be held in vertically adjusted position by either of the procedures hereinbefore referred to. The arm 12 can be adjusted in and out, in the guide 11, until the lower ends of the fingers 14 are positioned properly with respect to the work, and with respect to the work table 2, the work being held down on the work table, to be operated on by the drill 5. If a circular object, such as a rod, is to be drilled, it is received in the recesses 15 of the fingers 14 and is pressed against the work table 2.

Figure 2:
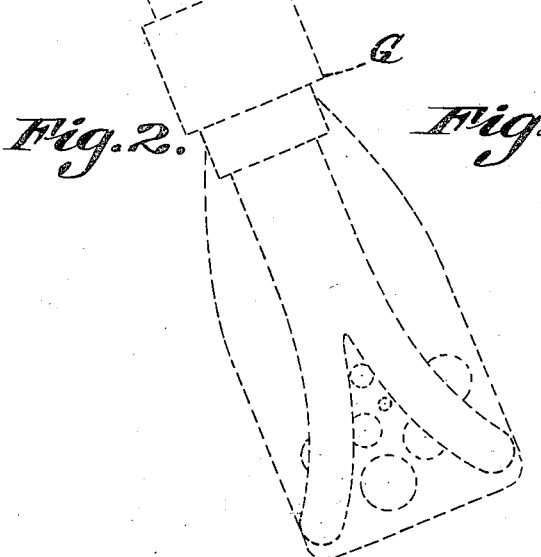
Fig. 2 is a top plan.
Figure 3:
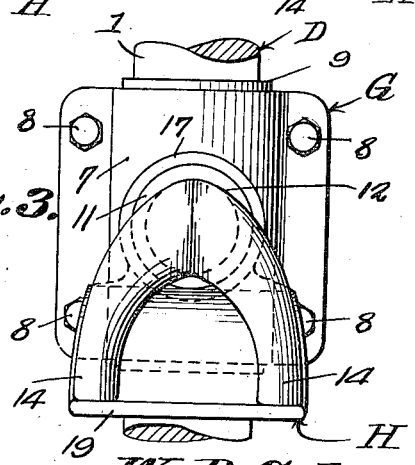
Fig. 3 is an end elevation.

The foot 19 of the holder H is provided with a plurality of holes 20 of different diameters. The holder H can be slid in and out on the guide 11, until any selected hole 20 is positioned properly with respect to the drill 5, so far as a component in the direction of the arrow A of Fig. 2 is concerned. The necessary component in the direction of the arrow B may be obtained by giving the entire tool or work grip G a horizontal swinging adjustment on the post 1.

If an object, such as a washer, is bound between the foot 19 and the work table 2, and is positioned under a selected one of the holes 20, it will be obvious that, as the drill 5 descends, the drill will enter the selected hole 20 and enlarge the opening in the washer or similar work.

During the operation last above referred to, the arm 12 can be slid in the guide 11, toward the post 1, so that the fingers 14 are not in the way of the descending drill 5, an observation which will be understood readily when the solid line portion of Fig. 2 is examined.

It should be noted that the arm 12 and its fingers 14 are not without function, even though they are out of the way of the descending drill 5. The bracket 18 and the foot plate 19 are by no means the strongest part of the machine, and even though the arm 12 may have been retracted, as aforesaid, the lower ends of the fingers 14 still will bear on the foot plate 19, sustaining and reinforcing the foot plate, and making it efficient to hold the washer or other object firmly down on the work table 2.

When the occasion for the use of the device forming the subject matter of this application has passed, it can be swung to one side, as indicated in dotted lines in Fig. 2 of the drawing. The drill 5 then functions with respect to the work table 2 in the usual way.

The device forming the subject matter of this application is simple in construction, will be found effective to consummate the objects set forth in the opening portion of this specification.

Having thus described the invention, what is claimed is:

1. In a work holder of the class described, a work grip including a carrier shaped for adjustment longitudinally of a support, a guide on the carrier, an arm mounted on the guide for adjustment in a direction substantially at right angles to the direction in which the carrier is adjustable, the arm terminating in transversely spaced, work-engaging fingers extended into approximate parallelism to the direction in which the carrier is adjustable, the fingers being provided terminally with work-receiving seats which are extended transversely of the fingers and are located in line.

2. In a work holder of the class described, a work grip including a carrier shaped for adjustment longitudinally of a support, a guide on the carrier, a work holding foot plate disposed substantially at right angles to the direction in which the carrier is adjustable, and having a hole for the passage of a drill, means for mounting the foot plate on the grip for adjustment in a direction substantially at right angles to the direction in which the carrier is adjustable, and an arm adjustable on the guide in a direction substantially parallel to the foot plate and having transversely spaced fingers bearing upon and sustaining the foot plate.

3. In a work holder of the class described, a work grip including a lateral guide, a work holding foot plate disposed substantially parallel to the guide and having an opening for the passage of a drill, means for mounting the foot plate on the work grip for adjustment in a direction substantially parallel to the guide, and an arm adjustable on the guide in a direction substantially parallel to the foot plate, and having a finger extended into contact with the foot plate, in sustaining relation thereto.

WILLIAM P. COLE.